Sept. 19, 1961 C. F. LOMBARD ET AL 3,000,020
SAFETY CUSHION
Filed May 15, 1958

CHARLES F. LOMBARD
KENNETH E. GREEN
INVENTORS

BY Lyon & Lyon
ATTORNEYS

United States Patent Office 3,000,020
Patented Sept. 19, 1961

3,000,020
SAFETY CUSHION
Charles F. Lombard, Rolling Hills, and Kenneth E. Green, Santa Ana, Calif., assignors to United Tanks, Inc., Alhambra, Calif., a corporation of California
Filed May 15, 1958, Ser. No. 735,399
5 Claims. (Cl. 5—355)

This invention relates to safety cushions, more particularly to safety seat cushions.

In the course of development of aircraft during the last decade or so, an increasing number of circumstances have arisen wherein there is potential danger of compressive fracture of the spine, due to reactive shock loads applied generally in line with the spinal column. In ordinary life such a shock load would occur to a person falling and hitting the floor with his spine vertically oriented thereto, as when a chair might be surreptitiously withdrawn from a person expecting to sit thereon.

In earlier days of aviation, such a shock load was likely to occur principally in an extreme emergency in which an aircraft would "pancake in," landing on the ground in normal orientation but with a vertical velocity much greater than normal. In recently-developed aircraft, particularly of military type, the decreased wing area in relation to weight necessitates greater forward flying speed during landing maneuvers. This restricts the choice of landing areas in emergency and increases the likelihood of flat contact at excessive vertical velocities.

In addition, again, due to the high wing loading of high-performance aircraft, many require a nose-high attitude in landing. Due to conditions departing only slightly from normal, it is increasingly common, with such aircraft, for the nose (in which the pilot or crew is customarily located) to drop suddenly once the main landing gear, which is located well aft of the cockpit, contacts the landing surface. This may occur, for instance, in landing high-performance aircraft on carrier decks, with use of arresting gear which engages the aircraft at or near the tail.

The almost universal use, in military aircraft, of ejection seats for emergency escape, the majority of which propel the occupant upward by means of an explosive charge in the mechanism, are also an occasional source of abnormally high impacts delivered at the base of the spine.

With the foregoing outline of the problem involved, the objects of this invention include:

First, to provide a safety seat cushion which is particularly designed for use in aircraft or fast moving vehicles wherein, in the event of an accident, a hard landing, an excessive maneuver, or upon bailout, impact forces between the seat cushion and the occupant may occur, the seat cushion being so constructed as to protect the spinal column of the occupant from compressive fracture and also to protect the soft parts of the buttocks from damage.

Second, to provide a safety seat cushion which includes a resilient pad operable under ordinary usage to promote the comfort of the user, an underlying crushable unit capable of absorbing energy to minimize crushing loads on the spinal column of the occupant, and an intermediate load-spreading unit to minimize localized shearing forces on those portions of the buttocks adjacent to the hip bones of the occupant.

Third, to provide a safety seat cushion which has a minimum of weight so that it may be incorporated in ejection seats of aircraft, or may be incorporated in the parachute pack assembly.

With the above and other objects in view, as may appear hereinafter, reference is directed to the accompanying drawings in which.

Figure 1:
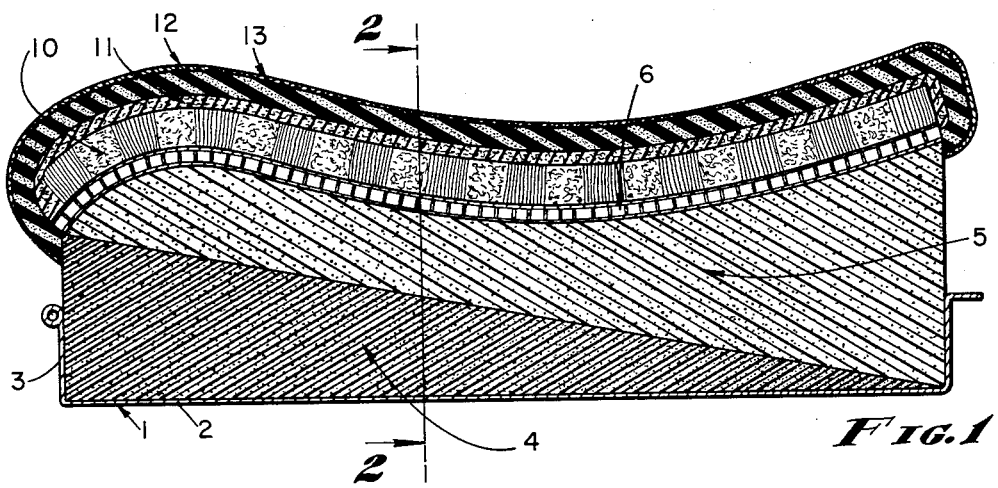
FIGURE 1 is a transverse sectional view of the safety seat cushion shown in its initial condition.

The safety seat cushion includes a retainer shell 1 having a bottom wall 2 and side walls 3 dimensioned to receive the seat cushion. The shell may be a part of the aircraft or other vehicle; it may be a part of the ejection assembly, or it may be a part of the assembly included in the parachute pack. The retainer shell is formed of sheet metal or other material capable of functioning as a load-distributing member with respect to forces applied by the aircraft structure.

Fitted within the retainer shell 1 is a lower crushable block 4 which is formed of a relatively inelastic, deformable, energy-absorbing material. For example, this may be a block of polystyrene foam, such as sold under the trade name "Styrofoam." The crushable block 4 preferably tapers from the front towards the rear of the seat cushion. Cemented to the lower block 4 is an upper crushable block 5 also formed of a relatively inelastic deformable, energy-absorbing material, such as Styrofoam. Materials suitable for the crushable blocks 4 and 5 are more fully set forth in Patent No. 2,625,683, issued January 20, 1953.

The lower block 4 preferably has greater compressive strength than the upper block 5. For example, the lower block may start to yield at a compressive load of 30 pounds per square inch, whereas the upper block may start to yield at 15 pounds per square inch. Block 4 may be 2½ pounds per cubic foot of Styrofoam and the upper block 5 of 1½ pounds density. Other densities of such substantially inelastic foam material may be employed, depending upon the conditions under when the crushable blocks are intended to function and the load-compression characteristics of the particular material chosen.

The upper surface of the crushable block 5 may be contoured from the comfort of the occupant, that is, the forward and rearward margins may be raised and the central portion depressed, as shown in FIGURE 1.

Cemented to the upper crushable block 5 and conforming to its contour is a load-spreading structure 6. The load-spreading structure may be of sheet metal having substantial tensile strength. However, it is preferred to utilize a composite structure which includes relatively thin, lower and upper surface sheets 7 and 8 between which is interposed a honeycomb structure 9. Other core structures having high rigidity with low weight may be employed, such as surface sheets with a foamed, substantially inelastic material similar to the blocks 4 and 5, but of greater density so as not to deform under ordinary conditions of use.

Figure 4:
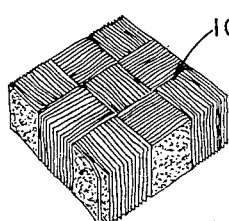
FIGURE 4 is a fragmentary perspective view of the fiber glass block spring construction.

Cemented to and conforming to the upper surface of the load-spreading structure 6 is a plurality of fiber glass block springs 10. These spring elements are formed of fiber glass cubes, each cube comprising a plurality of laminations which are positioned edgewise, that is, with the fibers substantially vertical. The laminations of adjacent blocks are oriented at right angles to each other as shown best in FIGURE 4. Fiber glass springs of this type are more fully disclosed in Patent No. 2,722,268, issued November 1, 1955.

Cemented to the upper surface defined by the fiber glass block springs 10 is an under padding 11 which may be also formed of fiber glass or of fibrous material laminated in an essentially horizontal direction, that is, parallel to its surfaces.

Cemented to the under padding 11 is a top padding 12 formed of a relatievly soft foam elastomer, such as rubber, synthetic rubber, or, for example, a foamed polyester or polyether. It is preferred that a foamed elastomer be selected in which the cavities are interconnected, rather than sealed from each other, so that on compression and expansion air may circulate in and out of the top padding. The top padding is provided with a suitable cloth covering 13, preferably woven so that air may circulate therethrough.

Operation of the safety seat cushion is as follows:

Under normal conditions of operation, the yieldable zone comprising the fiber glass block springs 10, under padding 11, top padding 12, and cover 13 constitute a comfort zone, in that it is capable of yielding readily to the movements of the occupant and also provides circulation. Under such conditions, the load-spreading structure 6 completely protects the crushable blocks 5 and 4 so that these blocks remain intact without change in shape. The load-spreading structure 6 is preferably sufficiently rigid that it may withstand a nominal degree of overloading, as might be occasioned by one standing or stepping onto the seat cushion.

It has been determined that the upper axial limits of head-to-seat force of the torso, that is, a force essentially parallel to the spinal column, is approximately twenty-five times the force of gravity (25 G). If this loading is approached, there is danger that the vertebrae will be crushed. Consequently, the strength of the crushable blocks 5 and 4, particularly the upper block 5, is calculated so that under a selected condition of impact of the body downward or the seat upwardly against the body, below that which would be injurious to the occupant, the upper crushable block will yield inelastically and in yielding absorb energy, so that the loads above this minimum are not transmitted to the body of the occupant.

Figure 2:
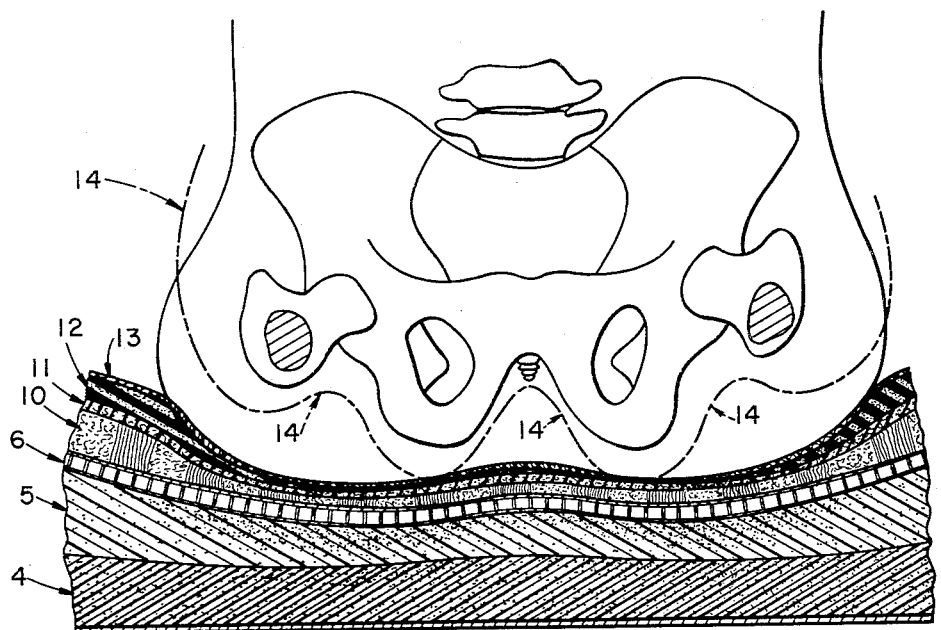
FIGURE 2 is a fragmentary sectional view through 2—2 of FIGURE 1, showing the manner in which the seat deforms under impact of an occupant seated thereon, the essential skeletal portions of the occupant's hips as well as the body in the region of the hips being indicated in outline.
Figure 3:
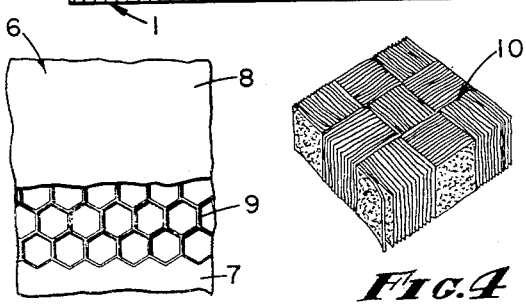
FIGURE 3 is a fragmentary plan view of the upper load-spreading structure.

The load-spreading structure 6 performs two important functions in this regard: First, it protects the crushable block so that it does not become crushed in localized areas, but remains intact for the emergency condition which may develop. Second, the load-spreading structure protects the fleshy portions of the occupant's buttocks. This is best illustrated in FIGURE 2.

Under conditions of impact, the readily yieldable layers above the load-spreading structure 6 collapse so that the force is directed primarily against the load-spreading structure. The load-spreading structure distributes the load throughout the buttocks of the occupant; and while the load-spreading structure does not yield uniformly, the contour which it assues is smooth and without discontinuities. If the load-spreading structure were omitted, localized yielding of the crushable blocks 5 and 4 would occur, in which case the flesh of the occupant would be forced into contour with the hip bones of the occupant as indicated by the broken line 14 in FIGURE 2. Under these conditions the flesh of the buttocks, anus, genitalia, perineum, and surroundings would be severaly damaged. Local damage to the skeleton could also occur.

The lower crushable block 4 forms, in effect, a second line of defense in the event that the upper block 5 is completely crushed. In fact, several laminations of increasingly greater resistance to crushing loads may be employed to effect a more refined absorption of the energy due to the impact loading betwen the seat and the occupant.

The retainer shell 1 also functions as a load-spreading structure and minimizes the effect of concentrated or localized loads which may be applied from the underside of the seat. For example, as pointed out previously, the safety seat cushion may constitute a part of the parachute pack in which may be incorporated a survival kit and other equipment dimensioned so that they would tend to apply localized loads against the retainer shell 1.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A safety cushion, comprising: a base structure substantially uniformly distributed of essentially inelastic deformable energy-absorbing material; a continuous load-distributing structure, substantially rigid and non-deformable under normal conditions of use covering said base structure; and a continuous resilient cushion unit covering said load-distributing structure.

2. A safety cushion, comprising: a body of inelastic deformable energy-absorbing material completely filling the area of expected impact and capable, on impact, of deforming and offering predetermined resistance to such deformation thereby to limit the impact force; load-distributing structures completely covering opposite sides of said body to minimize local deformation thereof; and a resilient cushion unit completely covering one of said load-distributing structures and adapted to receive an accupant in a sitting position; said one load distributing structure being substantially rigid and non-deformable under normal conditions of use.

3. A safety cushion, comprising: a body of essentially inelastic deformable energy-absorbing material completely filling the area of expected impact and capable, on impact, of deforming and offering resistance to such deformation thereby to dissipate the impact force; a load-distributing structure completely covering said body and including a deformation-resisting core and sheet material bonded to opposite surfaces thereof, said structure resisting local deformation of said body; a yieldable cushion unit completely covering said load-distributing structure and including blocks of parallel glass fiber laminations disposed in vertically and horizontally oriented sets and covering said load-distributing structure, padding covering said blocks, and a yieldable porous member covering said padding.

4. A safety cushion, comprising: superposed laminations of essentially inelastic deformable energy-absorbing material completely filling the area of expected impact and capable, on impact, of deforming and offering resistance to such deformation thereby to dissipate the impact force, the underlying lamination having greater resistance to deformation than the overlying lamination; a load-distributing structure, substantially rigid and non-deformable under normal conditions of use completely covering said laminations; and a resilient cushion unit completely covering said load-distributing structure.

5. A safety cushion, comprising: superposed laminations of essentially inelastic deformable energy-absorbing material completely filling the area of expected impact and capable, on impact, of deforming and offering resistance to such deformation thereby to dissipate the impact force, the underlying lamination having greater resistance to deformation than the overlying lamination; a load-distributing structure completely covering said laminations and including a deformation-resisting core and sheet material bonded to opposite sides thereof; a resilient cushion unit completely covering said load-distributing structure and including blocks of parallel glass fiber laminations disposed in vertically and horizontally oriented sets and covering said load-distributing structure, padding covering said blocks, and a flexible porous member covering said padding.

References Cited in the file of this patent

UNITED STATES PATENTS 1,843,893     Becher     Feb. 2, 1932

(References on following page)

UNITED STATES PATENTS

| | | |
|---|---|---|
| 2,552,039 | Flogaus | May 8, 1951 |
| 2,625,683 | Roth | Jan. 20, 1953 |
| 2,722,268 | Green et al. | Nov. 1, 1955 |
| 2,724,463 | Becker | Nov. 22, 1955 |
| 2,806,667 | Kugler | Sept. 17, 1957 |
| 2,819,712 | Morrison | Jan. 14, 1958 |
| 2,829,850 | Culver | Apr. 8, 1958 |
| 2,833,339 | Liljengren | May 6, 1958 |
| 2,857,510 | Haggerty et al. | Oct. 21, 1958 |

FOREIGN PATENTS

| | | |
|---|---|---|
| 1,191,604 | France | Apr. 13, 1959 |